United States Patent [19]

Marsh et al.

[11] Patent Number: 5,463,671
[45] Date of Patent: Oct. 31, 1995

[54] TELECOMMUNICATIONS NETWORK HAVING A DISTRIBUTED NETWORK OF DECENTRALIZED LOCAL STATIONS

[75] Inventors: Michael J. C. Marsh, Johannesburg; Trevor M. Hodson, Transvaal, both of South Africa

[73] Assignee: CSIR, Pretoria, South Africa

[21] Appl. No.: 152,503

[22] Filed: Nov. 16, 1993

[30] Foreign Application Priority Data

Nov. 16, 1992 [ZA]   South Africa ............................ 92/8822

[51] Int. Cl.$^6$ ................................................ H04Q 7/00
[52] U.S. Cl. ................................ 379/56; 379/58; 379/59; 379/61; 379/62; 370/50; 455/33.1
[58] Field of Search .................................. 379/56, 58, 59, 379/61, 62; 370/50; 455/33.1

[56] References Cited

U.S. PATENT DOCUMENTS

| | | | |
|---|---|---|---|
| 4,456,793 | 6/1984 | Baker et al. .................................. | 379/56 |
| 4,481,382 | 11/1984 | Villa-Real .................................. | 379/61 |
| 4,675,863 | 6/1987 | Pareth et al. .................................. | 370/50 |
| 4,694,484 | 9/1987 | Atkinson et al. .......................... | 379/58 |
| 4,776,000 | 10/1988 | Parierti .................................. | 379/62 |
| 4,837,800 | 6/1989 | Freeburg et al. . | |
| 4,876,740 | 10/1989 | Levine et al. ............................ | 455/33.1 |
| 4,972,456 | 11/1990 | Kaczmarek et al. ........................ | 379/59 |
| 5,159,592 | 10/1992 | Perkins . | |
| 5,239,673 | 8/1993 | Natavajan ................................ | 455/33.1 |

FOREIGN PATENT DOCUMENTS

| | | |
|---|---|---|
| 2400491 | 5/1983 | Germany . |
| 2248999 | 4/1992 | United Kingdom . |
| WO91/07856 | 5/1991 | WIPO . |
| WO91/18468 | 11/1991 | WIPO . |

OTHER PUBLICATIONS

Scott, et al "A New Way to Provide Telephone Services with Subscriber Radio", ICC 78, 1978 International Conference Jun. 4, 1978.
Karvonen, "Aki Wilderness Telephones" Telephony, May 28, 1984.
"The Cellular Concept", V. H. Mac Donald, The Bell Systems Technical Journal, vol. 58, No. 1, Jan. 1979.

*Primary Examiner*—Curtis Kuntz
*Assistant Examiner*—William Cumming
*Attorney, Agent, or Firm*—Lowe, Price, LeBlanc & Becker

[57] ABSTRACT

A method of establishing a telecommunications network. The method includes the steps of providing a network of local stations joined to one another by microwave links, and arranging, in a cluster around each local station, a plurality of subscriber, or telephone stations, each subscriber station having a unique code. Optical telecommunications links are then established between the subscriber stations and their associated local station. The operation of the network is managed using a system controller, which includes a system controller database incorporating a network map, subscriber and local station data. Associated local databases are established at each of the local stations, and the various databases are continuously and automatically updated via the network in response to a change on the configuration of the network.

10 Claims, 8 Drawing Sheets

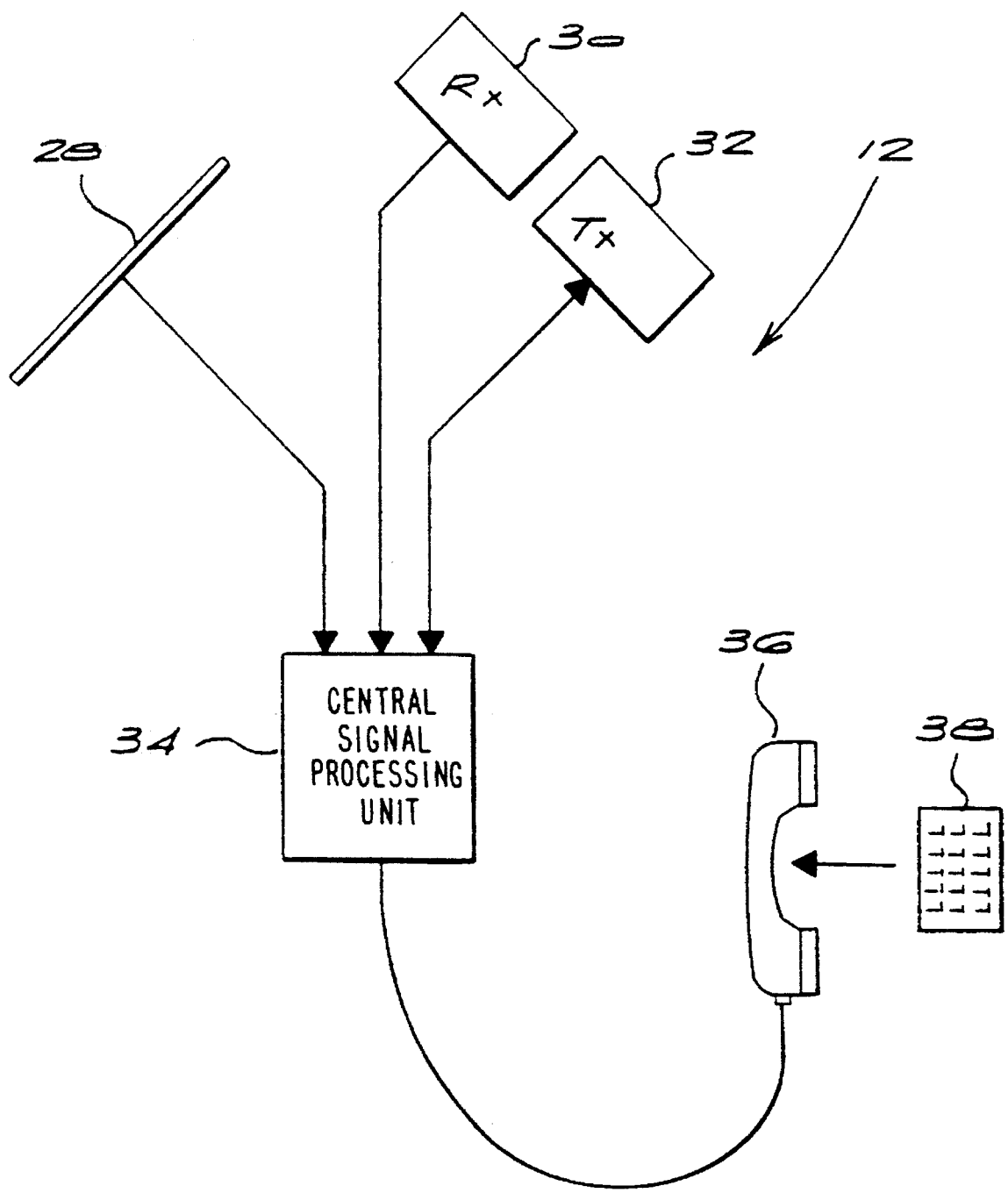

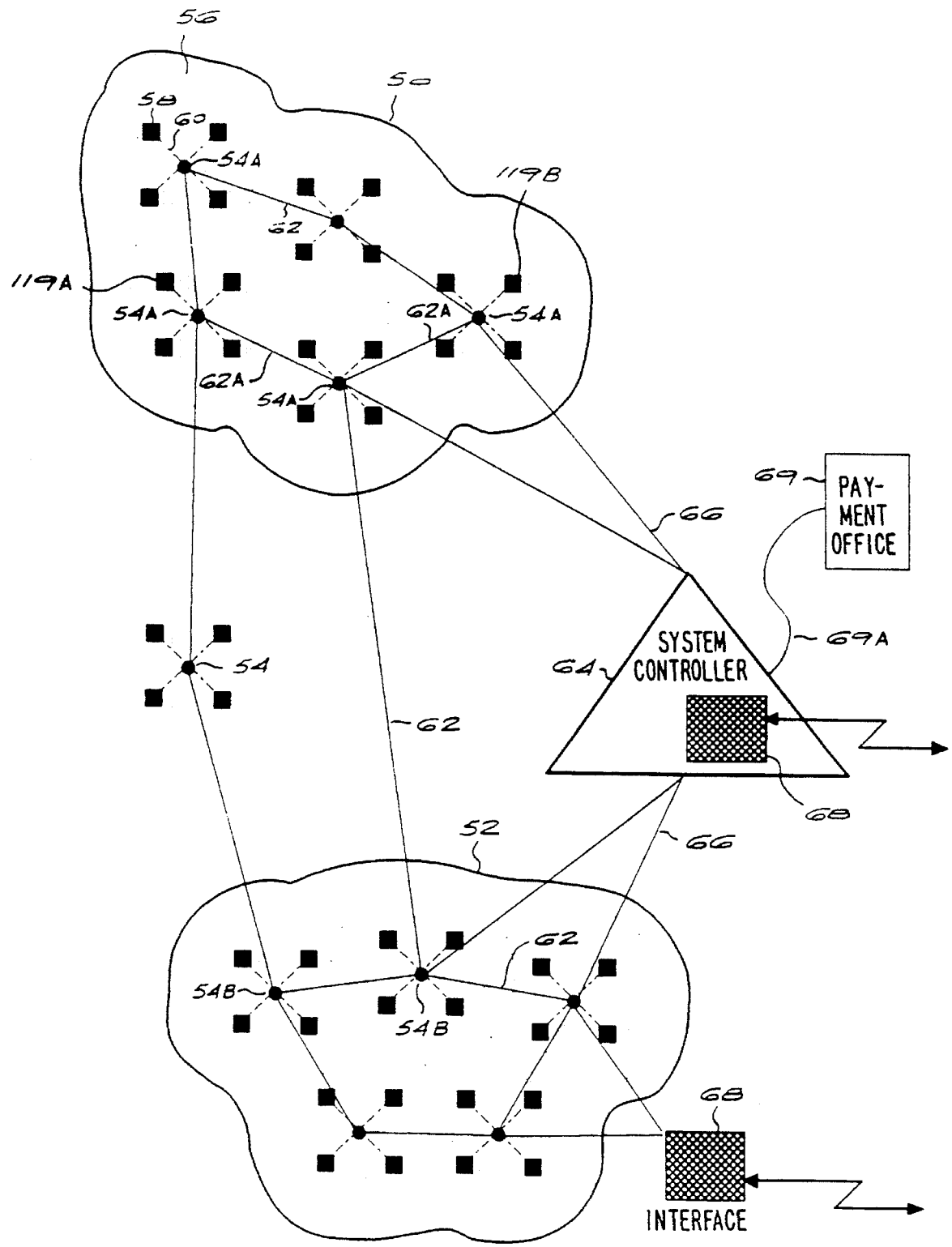

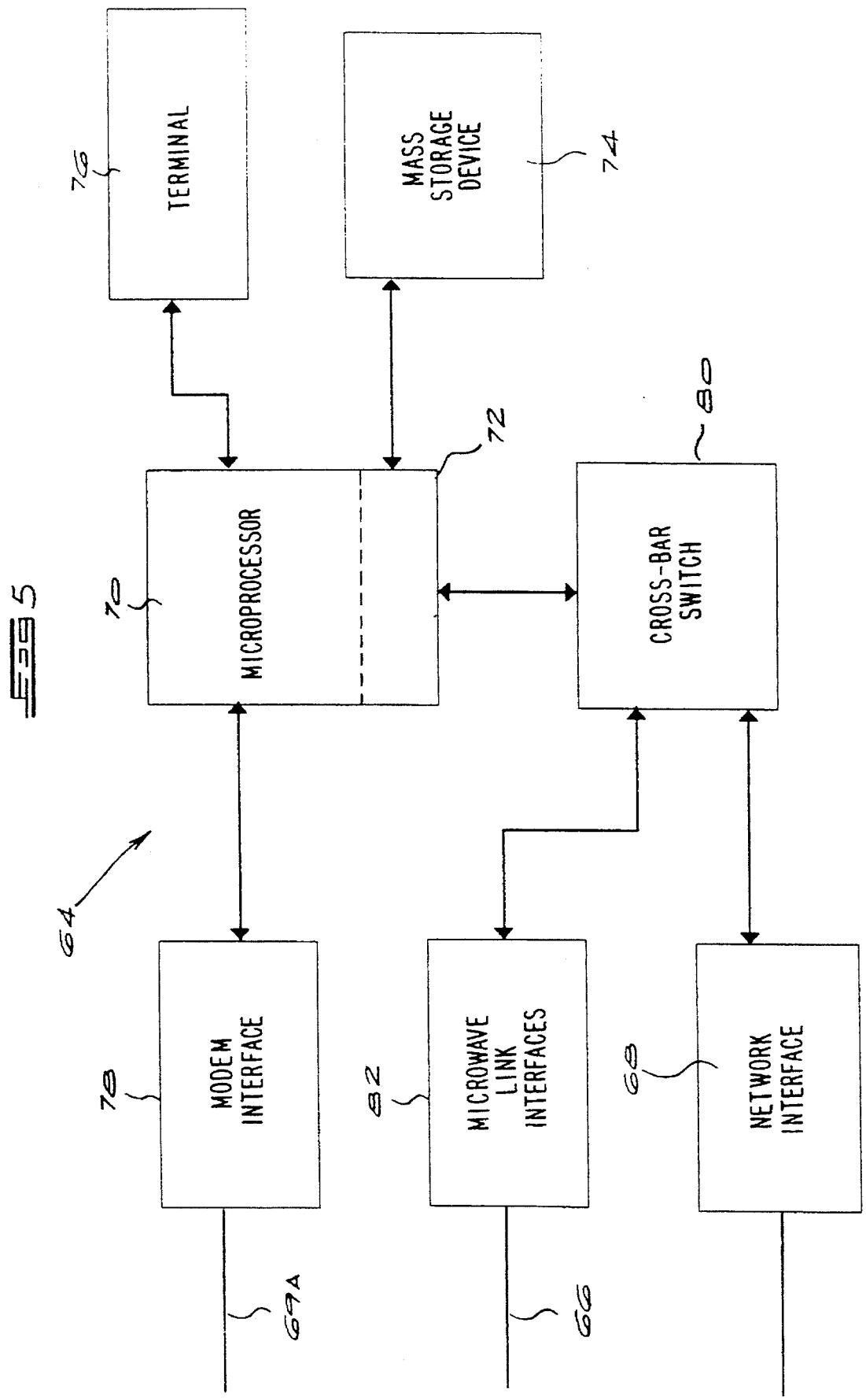

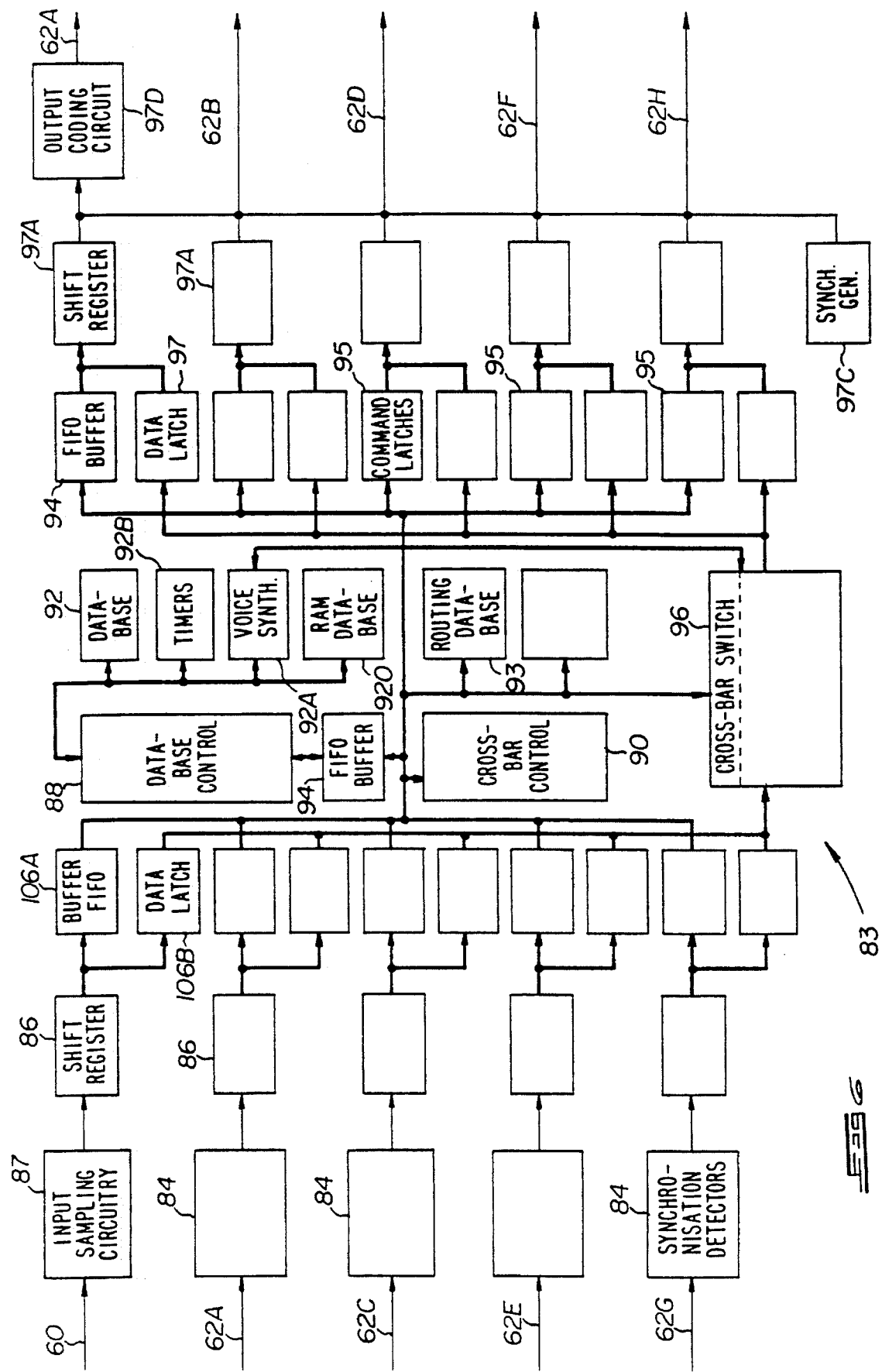

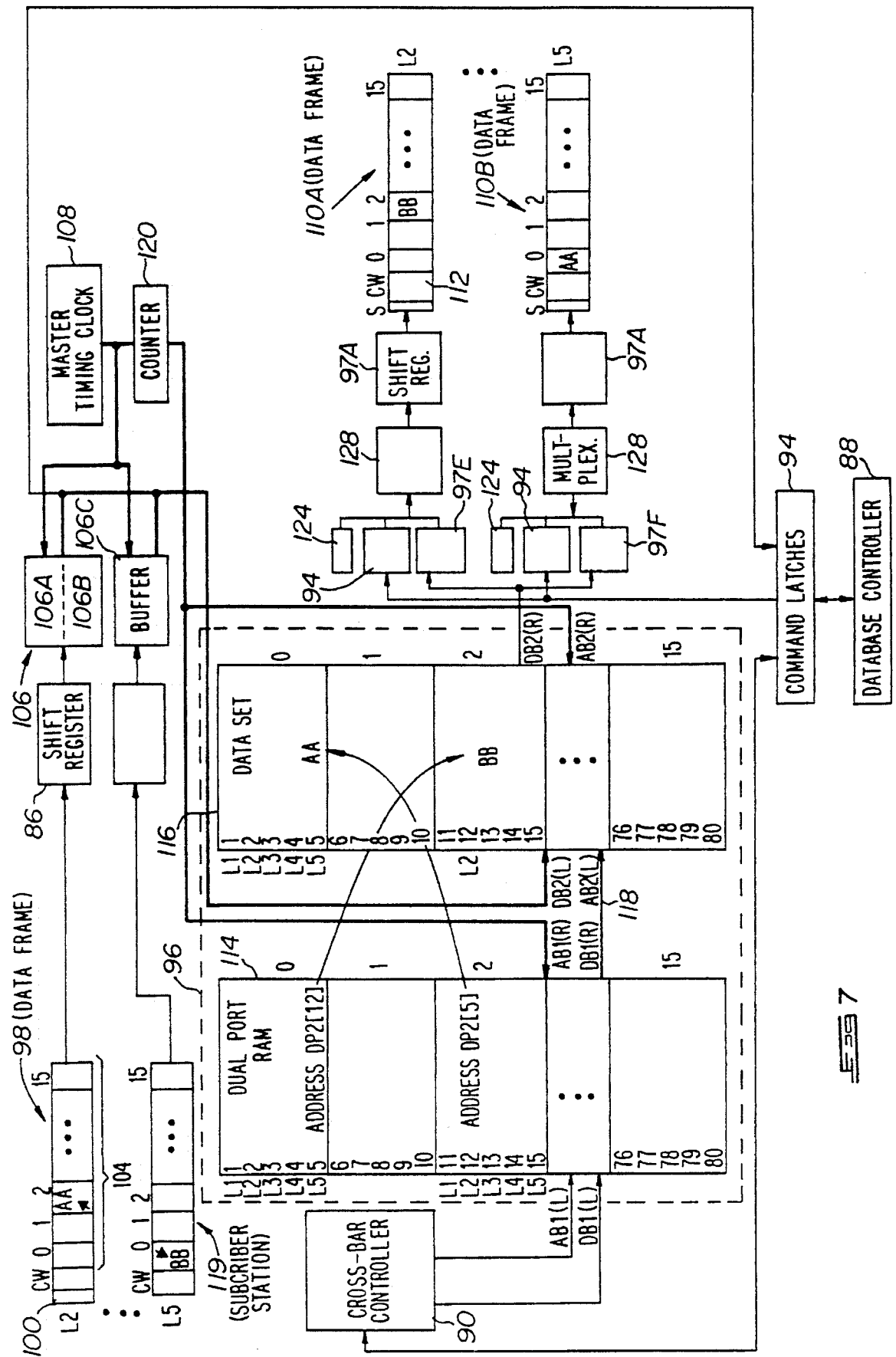

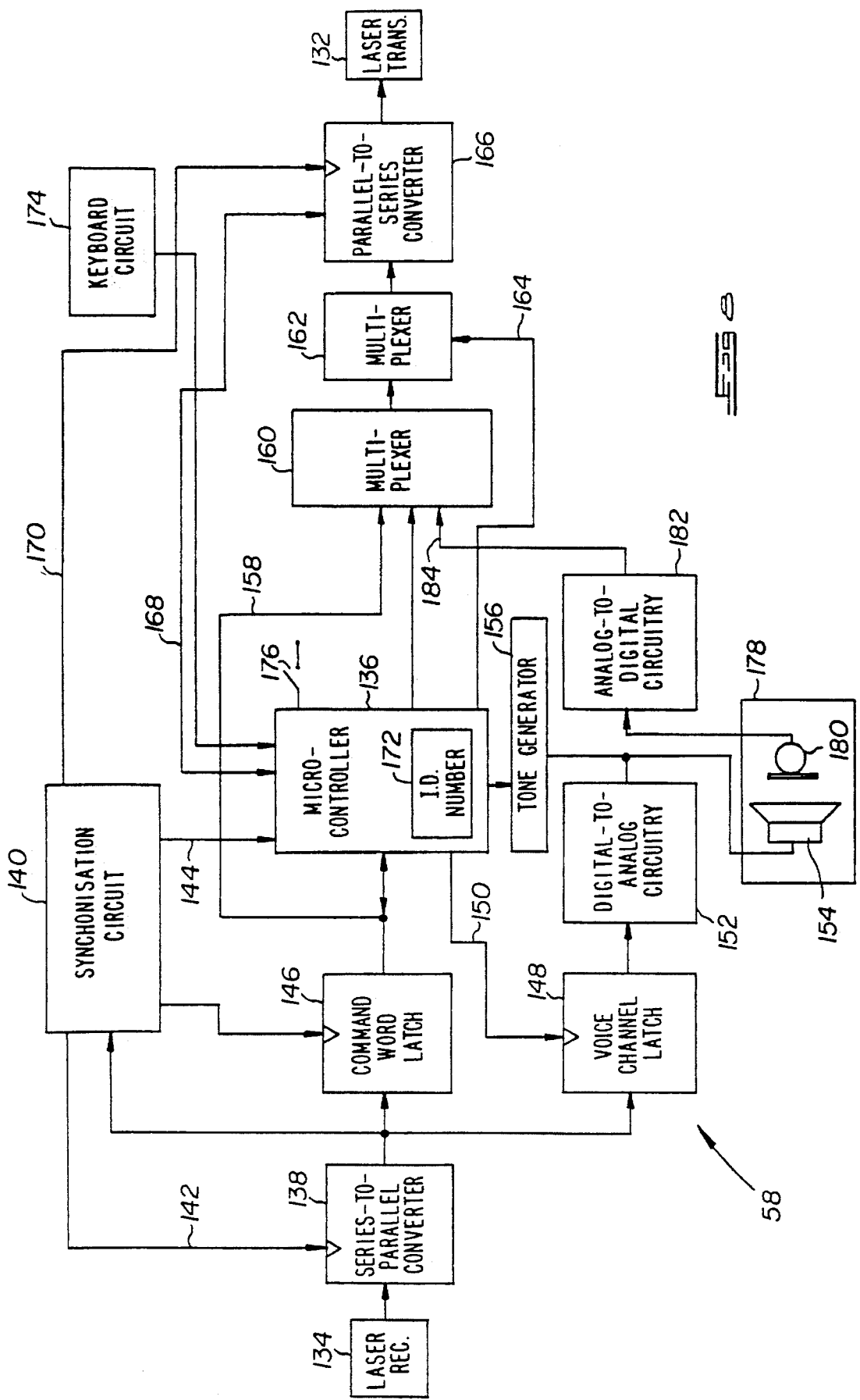

TELECOMMUNICATIONS NETWORK HAVING A DISTRIBUTED NETWORK OF DECENTRALIZED LOCAL STATIONS

BACKGROUND OF THE INVENTION

This invention relates to a telecommunications network, as well as to a method of establishing a telecommunications link between a remote telephone and a central exchange.

In most third world countries, the large majority of rural communities and even poorer urban communities do not enjoy the benefits of even the most basic telecommunications system. At best, these communities have access to one or more pay phones which are invariably vandalised.

Conventional hardwired systems involve an expensive infrastructure including copper wiring leading from each subscriber's telephone to the central exchange. An extensive network of trenches and telegraph poles are required to route the copper wiring. The provision of copper wiring in areas such as remote villages and squatter camps is impractical, in that it is extremely expensive to install and it is usually stolen by those members of the community who do not have a telephone system. Maintenance of a hardwired telecommunications infrastructure in such areas is arduous; in some cases, an element of danger may even exist. Cellular radio systems are relatively expensive to manufacture, in that there are critical components in each radio that require accurate tuning.

SUMMARY OF THE INVENTION

According to a first aspect of the invention there is provided a method of establishing a telecommunications network comprising the steps of:
a) providing a network of local stations joined to one another by telecommunications links;
b) arranging, in a cluster around each local station, a plurality of subscriber stations, each subscriber station having a unique code;
c) establishing subscriber telecommunications links between the subscriber stations and their associated local station;
d) managing the operation of the network using a system controller;
e) establishing, at the system controller, a system controller database incorporating a network map, subscriber and local station data;
f) establishing associated local databases at each of the local stations; and
g) continuously and automatically updating the various databases via the network in response to a change in the configuration of the network.

Preferably, the change in the configuration of the network includes the addition, subtraction or relocation of at least one local station and/or at least one subscriber station.

Conveniently, the method includes the step of automatically allocating a telephone number to a subscriber station via a local station on joining the network, once the communications link has been established.

Advantageously, the method includes the initial steps of providing each telephone with a unique identity number, transmitting the unique identity number to the associated local station, and linking, at the local database, the unique identity number with the telephone number prior to allocation thereof.

Typically, the method includes the step of entering, at a payment station, the unique identity number of a telephone, and personal identity information of the associated subscriber, receiving payment from the subscriber, entering associated credit information, linking, by means of the unique identification number, the telephone number allocated at the local station with the data entered at the payment station, and enabling the relevant subscriber station in the event of a credit balance existing in respect thereof.

The method may further include the step of allocating a station identification code to each local station, and using this identification code as a component of the telephone numbers which are allocated to each subscriber station in the associated cluster.

The method may include the still further step of using the network map to determine the route of a call from one subscriber station to another via a plurality of selected local stations, and re-routing the call via alternative local stations in the event of one or more of the selected local stations being temporarily disabled, due to overloading or the like.

Optionally, the method may include the step of interfacing the telecommunications network with a conventional telephone network via the system controller and/or the local stations.

According to a second aspect of the invention there is provided a method of establishing a telecommunications link between first and second subscriber stations including the steps of:
a) receiving, at a local station, a characteristic signal originating from the first subscriber station and having a unique identification code associated with the second subscriber station;
b) transmitting a synchronising signal from the local station simultaneously to the subscriber stations in the vicinity thereof for synchronising a command data frame at the local station with a reply data frame at the subscriber stations;
c) transmitting the characteristic signal via an optical link from the local station to a plurality of subscriber stations in the vicinity of the local station, at least one of which is the second subscriber station;
d) positively identifying the characteristic signal at the second remote subscriber station and retransmitting to the central station a signal representative of the second subscriber station; and
e) allocating at the local station a communications channel for establishing a voice-based telecommunications link between the first and second subscriber stations.

The invention extends to a telecommunications network comprising:
a) a network of local stations, each station having an associated local station identification code, and a local database;
b) a plurality of telecommunications links joining the local stations;
c) a plurality of subscriber stations arranged in clusters around each local station, each subscriber station having a unique identification code;
d) a plurality of wireless subscriber telecommunications links joining the subscriber stations to their associated local station;
e) a system controller for managing the operation of the network, the system controller including a system controller database incorporating a network map, subscriber and local station data; and
f) updating means for continuously and automatically updating the various databases via the network in response to a change in the configuration of the network.

Preferably, the updating means includes allocating means for automatically allocating a telephone number to a subscriber station on joining the network, once the subscriber telecommunications link has been established.

Advantageously, the telecommunications network includes routing means for routing a call from one subscriber station to another via a plurality of selected local stations on the basis of the network map, and re-routing means for re-routing a call via alternative local stations in the event of one of the selected local stations being temporarily disabled.

The allocating means may include a database controller at the local station for receiving the unique code from each subscriber station, for generating the telephone number by combining an allocated number from the database with the local station identification code, and a voice synthesizer for transmitting the allocated telephone number to the subscriber station.

The telecommunications network advantageously includes a prepayment station for establishing a credit facility for each subscriber, the prepayment station being linked to the system controller database and including data entry means for entering personal details of each subscriber, and the unique identification number associated with the telephone.

The subscriber telecommunications links are preferably optical infra red links, and the subscriber stations are preferably clustered in line-of-sight around the local stations.

The invention extends to a local station forming part of a telecommunications network, the local station including an elevated exchange arranged in line-of-sight with a surrounding cluster of subscriber stations, the exchange comprising:

a) subscriber data transceiver means for providing subscriber telecommunications links for serially transmitting and receiving voice and other data to and from the subscriber stations;

b) local station data transceiver means providing local station links for serially transmitting and receiving voice and other data to and from the other local stations in the network;

c) a local database for storing data relating to the network, including a network map, subscriber and local station data;

d) a database controller for controlling the database; and e) selector means for selecting communication paths between incoming and outgoing links.

Conveniently, the selector means includes a cross-bar switch and a cross-bar controller for controlling the switch.

The local station conveniently includes input synchronising means for separately synchronising incoming data from the telecommunications links, and output synchronising means for simultaneously synchronising outgoing data.

According to a still further aspect of the invention there is provided a subscriber station for incorporation into a telecommunications network, the subscriber station including a telephone comprising;

a) a central micro-controller having a unique identification number stored therein;

b) a dialling unit;

c) a laser transmitter and a laser receiver arranged to be mounted in line-of-sight with a local station; and d) clock regeneration, frame and bit synchronisation circuitry for controlling the timing and synchronisation of data frames received and transmitted via the respective laser receiver and transmitter, and being arranged to select and to receive a frame synchronising bit, the micro-controller being responsive to the bit synchronisation circuitry and being arranged to enable a voice channel latch only in the event of a correct voice channel being received from an input data frame.

BRIEF DESCRIPTION OF THE DRAWINGS

FIG. 2 shows a highly schematic block diagram of the subscriber's end of the telecommunications network of FIG. 1;

FIG. 4 shows a highly schematic layout of a second preferred embodiment of a telecommunications network of the invention;

FIG. 5 shows a schematic block diagram of a system controller forming part of the telecommunications network of FIG. 4;

FIG. 6 shows a schematic block diagram of a local or pole exchange forming part of the telecommunications network of FIG. 4;

FIG. 7 shows a more detailed block diagram of a cross-bar switch and associated circuitry forming part of the pole exchange; and FIG. 8 shows a schematic block diagram of a telephone at the subscriber's end of the telecommunications network.

DESCRIPTION OF EMBODIMENTS

Figure 1:
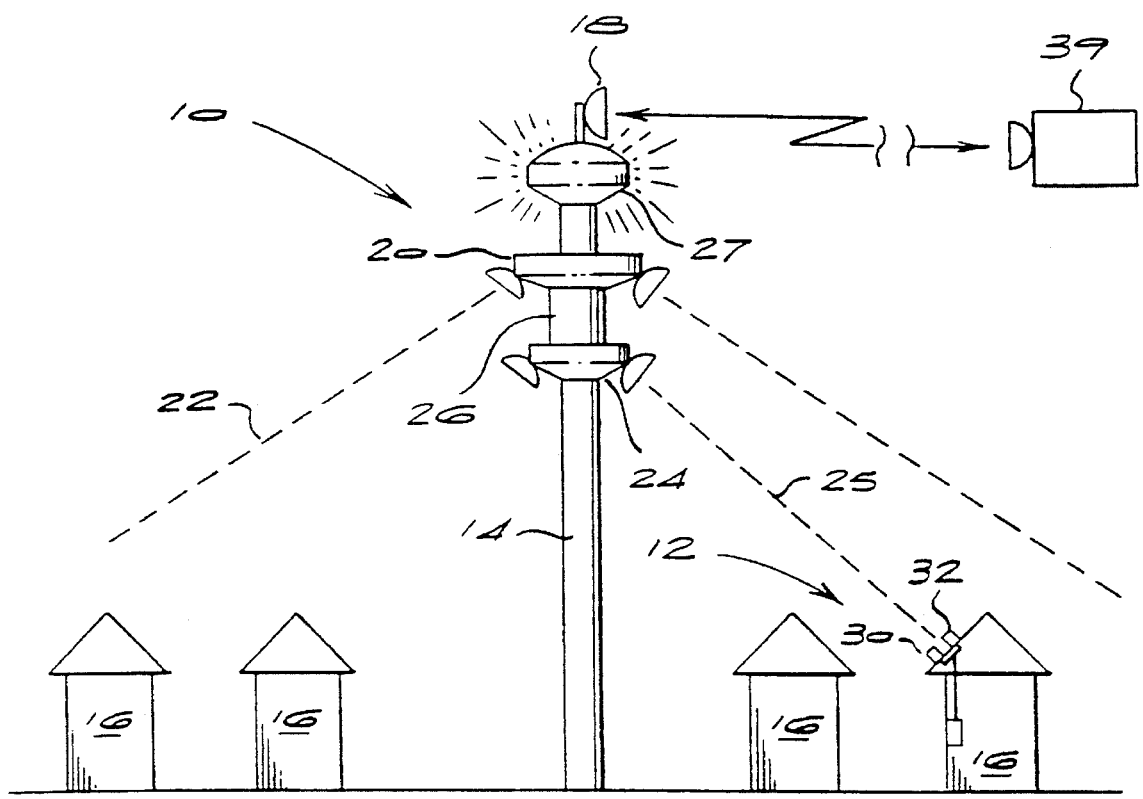
FIG. 1 shows a highly schematic view of part of a first embodiment of a telecommunications network of the invention.

The telecommunications network illustrated schematically in FIG. 1 includes a central, or local station 10 and a plurality of subscriber stations 12. The central station 10 is mounted on a high mast 14 which is located in the center of a group of dwellings 16 making up a village. Mounted atop the mast 14 is a conventional microwave link 18 incorporating a microwave antenna coupled to a microwave transmitter and receiver. Just beneath the microwave antenna is an optical transmitter 20 which has a conical footprint, as is indicated in broken outline at 22, which illuminates those dwellings 16 in the village which are served by the telecommunications network. Located just beneath the optical transmitter 20 is a receiver 24 for receiving signals 25 from the various subscriber stations 12 located in the dwellings 16. A pole-top telephone exchange 26 for the village is mounted between the transmitter 20 and the receiver 24. An overhead light 27 is mounted just beneath the microwave link 18.

Turning now to FIG. 2, each subscriber station 12 is powered by a roof-mounted solar cell 28 and includes a receiver in the form of a receiving laser diode 30 and a transmitter in the form of a transmitting laser diode 32.

Both the receiver 30 and the transmitter 32 are coupled to a central signal processing unit 34. Also connected to the signals processing unit 34 is a telephone handset 36 which incorporates a keypad 38. As is shown in FIG. 1, both the receiver 30 and the transmitter 32 are mounted on the roof of the dwelling 16, in line-of-sight with the respective central transmitter 20 and receiver 24. Storage batteries may be provided for powering the subscriber station at night.

Each signal processing unit 34 has a unique identification number associated therewith by means of which signals carrying such an identification number and directed to it via the central transmitter 20 can be recognised. The mode of modulation of the signals between the respective central transmitter and receiver 20 and 24 and the respective subscriber receiver and transmitter 30 and 32 is such that it provides for sixteen simultaneous conversations to take place between subscribers in the village and/or other subscribers in the national network to which the microwave link 18 is coupled. As many as between four hundred and five hundred subscribers per pole top exchange 26 could be provided with subscriber stations 12, although only sixteen of these stations them could be linked via the exchange 26 to the national network at any one moment.

Figure 3A:
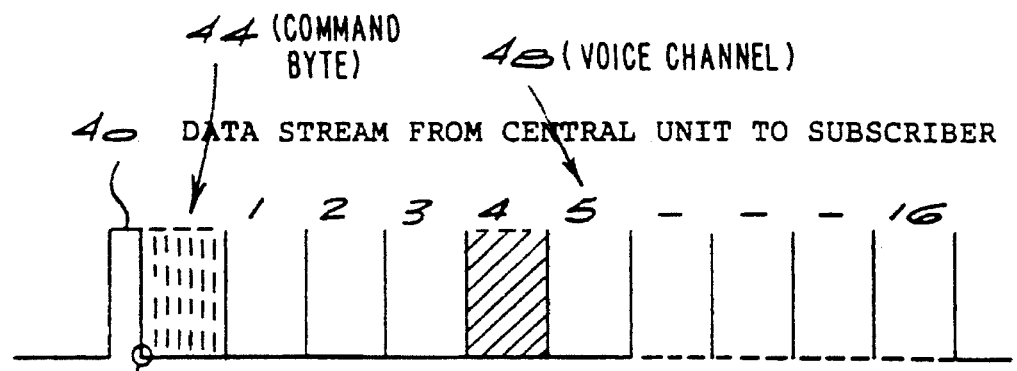
FIG. 3 shows a time-based graphical diagram indicating how data frames, are transmitted between a subscriber and a local station.
Figure 3B:
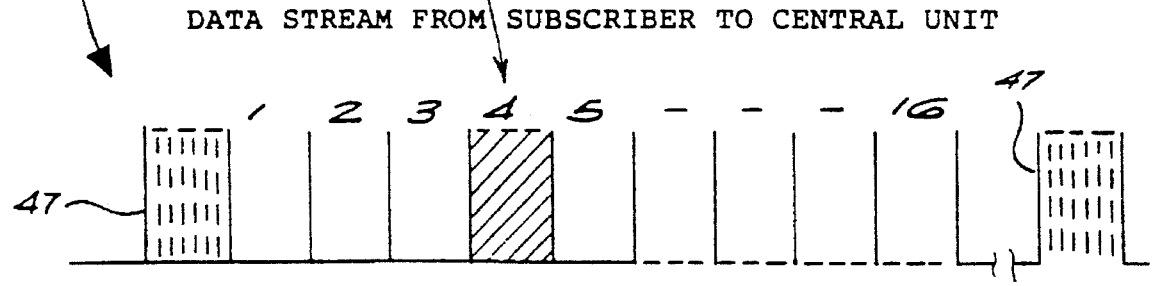

The central transmitter 20 includes a laser diode which typically radiates data from the mast 14 at a rate of 1.112 Mbits $s^{-1}$. As is shown in FIG. 3, in order to receive a call from a signal from a main station 39 outside the village, the central transmitter 20, on receipt of a signal via the microwave link 18, radiates a synchronising pulse 40 followed by the number of the unit being sought a command byte 44.

The synchronising pulse 40 sets up a reply frame 45 at the right moment in all of the unoccupied subscriber stations, all of which are continuously monitoring the transmission from the central transmitter 20.

On recognition of the identity number, the signals processor 34 associated with that particular identity number provides a ringing tone in the relevant dwelling, and transmits its own particular identity number back to the central receiver 24 in a subsequent synchronised reply frame 46. The command frame 44 then responds by allocating to the subscriber station 12 one of sixteen time slots defining sixteen voice channels 48. When the subscriber answers the telephone, the conversation is transmitted in a time division multiplexing (TDM) method using the particular voice channel, such as voice channel 4, which has been allocated by the pole exchange 26 via the central transmitter 20. In this manner, the pole exchange is able to assign up to sixteen different conversations at one moment.

When the subscriber wishes to originate a telephone conversation by picking up the telephone handset 36, the signals processing unit 34 contacts the central receiver 24 on the mast 14 by transmitting its unique associated identity number in the command byte 47 of one of the reply frames via the subscriber transmitter 32. Should spare capacity be available, the central, or command transmitter replies in a command transmission mode indicating the particular time slot number to be utilised. Dialling information is then transmitted from the subscriber station 12 to the central station 10, from where it may be transmitted via the microwave link 18.

Referring now to FIG. 4, a current preferred embodiment of a telecommunications network is illustrated.

Only part of the telecommunications network, which covers two neighbouring villages 50 and 52, is shown. Each village has a number of local stations 54A and 54B, which are similar to the central station 10 illustrated in FIG. 1. The local stations 54A and 54B have a footprint 56 of approximately 130000 $m^2$, which typically includes about 400 subscribers. Each subscriber has a telephone or subscriber station 58 which is linked to the local station 54A or 54B via an optical link 60. The local stations 54A and 54B include pole-mounted exchanges, which will be described in more detail further on in the specification. The pole-mounted exchanges are linked to one another by means of microwave links 62.

The entire network is controlled and managed by means of a system controller 64, which is preferably located outside of the villages 50 and 52 in a position that allows it to be easily accessed by service personnel, but still in a central position which allows it to be linked with at least two of the local stations 54A and 54B in each cluster via microwave links 66, or alternatively via cabling. Both the system controller 64 and the local stations 54A or 54B may have interfaces 68 which allow them to be connected to a conventional existing telephone network. Each system controller 64 and its associated cluster of local stations 54A and 54B forms a local exchange area.

A subscriber has to be in credit before he can receive or make calls. Accordingly, a payment office 69 is located nearby the villages, and is linked to the system controller 64 via a microwave or cable link 69A. Credit information is transferred between the local stations 54A and 54B, the system controller 64 and the payment office, where the subscribers make advance payments.

Each subscriber telephone 58 has a characteristic identification code that uniquely identifies it from all other telephones manufactured. This identification code serves as a primary reference in the various databases against which all other subscriber information is entered. All payments are thus made against this unique identification number. In addition, each telephone is automatically assigned a different telephone number, in a manner that will be described in more detail further on in the specification.

Each pole-top exchange has up to four microwave links, thereby allowing a call from one local station to another to be re-routed via a number of different paths in the event of one pole exchange being fully occupied. Communication between pole exchanges, as well as between individual telephone stations and via pole exchanges is effected using time division multiplexing (TDM). The format of the TDM frame includes three synchronising bits, a command byte and sixteen digitised voice bytes which provide sixteen voice channels, as was described earlier on in the specification with reference to FIG. 3. The command byte of the frame is used for command messages and for the transmission of data between the pole exchange and the telephone stations. The frames are transmitted serially and are repeated approximately 8000 times per second. The pole exchange transmits to all the telephone stations simultaneously, and each telephone station can transmit to its associated pole exchange either in the command byte slot or in one of the voice channels.

The various components of the telecommunications system will now be described in further detail.

System Controller

The system controller 64 illustrated in FIG. 5 has a microprocessor 70 at its heart. The microprocessor 70 has a memory component 72 having operating software stored therein for performing various management tasks. A separate mass storage device 74 is provided for storing the various databases and other data that the system controller is responsible for managing. A terminal 76 allows maintenance personnel access to the various databases. The maintenance operator can update or change the databases using this terminal, as well as performing fault-finding routines, accessing system statistics, querying subscriber accounts and the like. A modem interface 78 is provided in the link 69A to the payment office 69, and allows the microprocessor to communicate with a corresponding terminal in the payment office 69. An operator can thus record payments made by the subscribers and answer subscriber's queries. The data transfer between the terminal at the payment office 69 and the microprocessor 70 is encrypted using known techniques for security purposes.

A cross-bar switch 80 is provided to allow the microprocessor 70 to send and to receive command data, (data from the command byte of the TDM frame) respectively to and from the microwave links 66 via microwave link interfaces 82. The microprocessor 70 is thus able to transmit messages and data via the microwave links 66 to any local station 54A or 54B in the exchange area. Calls can also be routed between the different microwave links, as well as between the microwave links and the conventional network interface 68. The system controller 64 thus doubles as an exchange. The cross-bar switch 80 is similar to that used in the pole exchange, and will be described in further detail later on in the specification.

The conventional network interface 68 converts voice data from the sixteen voice channels into a standard telephone format of sixteen telephone lines, and vice versa. Dialling information is also transferred to and from the command byte of the TDM frame by the conventional telephone network interface 68.

The system controller 64 is responsible for the overall management of the pole exchanges that fall within the exchange area. The management tasks include the following:

maintaining a logical map of all the subscriber telephone stations, together with the unique identification number of each telephone and the pole exchanges to which they are linked;

maintaining a database of all subscribers, including personal details, telephone numbers, credit information and the unique identification numbers of each telephone;

maintaining a directory of all the subscribers in the particular exchange area covered by the system controller;

maintaining a complete list of all telephone identification numbers that have been blacklisted, such as stolen telephones;

updating of subscribers' credit information when the subscriber makes payment, as well as indicating when additional payment is required;

downloading through the microwave links 66 to each pole exchange the relevant information for each subscriber telephone station 58 which is linked to a particular pole exchange via one of the local stations 54A or 54B;

downloading to each pole exchange a routing map of all the pole exchanges;

management of the various electronic services that can be provided;

self-reporting of faults, which may, for example, arise in one of the local stations 54A or 54B or in the system controller itself; and transferring of new operating system software programs to the local stations 54A and 54B via the microwave link.

Examples of these electric services may be available credit, an electronic telephone directory, telephone numbers which have been allocated, the statuses of such numbers, local news and events and advertising. These services are managed by downloading the required information to the various local stations. The system controller is able to update these services and to add new services.

Pole Exchange

The pole-mounted exchange 83 illustrated in block diagram form in FIG. 6 is responsible for establishing microwave links between local stations 54, as well as serving the telephone subscriber stations 58 via the optical links 60. Each pole exchange has a unique three digit number associated with it for facilitating the automatic routing of telephone calls. The pole exchange has five bi-directional communications channels, including the input and output infra red optical laser links 60 and 60A for communicating with the individual subscriber telephone stations 58, as well as four separate input and output microwave links 62A and 62B, 62C and 62D, 62E and 62F, and 62G and 62H. The unique three digit number facilitates the automatic routing of telephone calls, and allows the microwave links to be used to transfer a call coming in either from one of the subscriber stations 58 or via the microwave links to adjacent local stations 54A and 54B.

In view of the variation in the distance between the different local stations 54A and 54B, all signals do not arrive at the pole exchange 83 at the same time. Consequently, the signals received from other pole exchanges have to go through time synchronisation circuitry, which includes clocked synchronisation detectors 84. Signals received from the subscriber stations 58 via the optical link 60 are in synchronisation with the transmitted signals as they use the same synchronising bytes to control their timing. Consequently, no time synchronisation circuitry needs to be employed. The optical signals pass through input sampling circuitry 87 for converting the digital signals from a return-to-zero to a TTL format.

The pole exchange 54 is divided into two microprocessing sections, namely a database controller 88 and a cross-bar controller, or command processor 90.

The database controller 88 contains a database of all the subscribers beneath the pole exchange 54, including their names, identity numbers, telephone numbers, blacklist information (if a phone is stolen), language preference and status (special privileges for higher rate), together with other information which has been uploaded from the system controller 64. This information is stored in RAM in a separate database 92. This database also updates the credit balances of the various subscribers as calls are made. These are later relayed to the system controller 64.

A voice synthesizer 92A is controlled by the database controller 88, and is used to broadcast messages and instructions to the individual subscribers, such as information on their available credit. The database controller 88 also controls a number of timers 92B, which in turn perform all the timing functions of the exchange.

A RAM database 92D contains a map of the locations of all the pole exchanges served by the system controller 64 via the microwave link interfaces 82. The map includes routing instructions incorporated in a separate routing database 93 accessed by the cross-bar controller 90, and allows messages to be conveyed to a distant pole exchange from the pole exchange in question. These instructions provide for alternative routing scenarios, so that in the event of one of the microwave links 62 being fully occupied, an alternative route can be selected. Some of the commands received in the command bytes are referred to the database controller 88, which interprets the desired instruction and issues commands via a bi-directional FIFO buffer 94 either to the cross-bar controller 90 or to one of five output command latches 95. The rest of the commands are handled directly by the cross-bar controller 90.

The relevant data is routed through a cross-bar switch 96 under the control of the cross-bar controller 90 onto the relevant user, via a data latch 97 and a parallel-to-series shift register 97A. A synchronisation generator 97C synchronizes the output data, and an output coding circuit 97D is located on the output optical link 60A, which will presently be described in more detail. As the database controller 88 has no direct contact with the subscriber stations, and as the command processor 90 requires data under the control of the database controller 88, there is substantial interaction between these two microprocessors.

Referring now to FIG. 7, and as was described in an earlier embodiment with reference to FIG. 3, each data frame 98 comprises three synchronisation bits 100, a command byte 102 and sixteen bytes 104 which are allocated to voice channels. The data frame 98 is transmitted sequentially at a data transfer rate of 1.112 Mbits s$^{-1}$. The cross-bar controller 90 is able to switch each of the sixteen data bytes transmitted from subscriber stations 58 and the other data links through any other data byte storage section on the links of the cross-bar switch 96 for transmission either to one of the subscriber stations or to one of the other pole exchanges. The cross-bar controller 90 has a standard operating function which performs all the time critical issues of the routing procedure, and is also capable of uploading information into the database controller 88 for re-programming and modifying the database 92 via the system controller 64.

The incoming data frame 98 passes through the serial-to-parallel shift register 86 to a time synchronising circuit which includes a buffer 106 having a command FIFO portion 106A and a data latch 106B. The data is clocked into the buffer 106 by means of a master timing clock 108 which also governs the timing of the cross-bar controller 90.

The first full byte 102 of the data packet is extracted as the command word, which is then passed on to the data base controller 88 or the cross-bar controller 90 for interpretation. The remaining sixteen bytes 104 are then resorted via the cross-bar switch 96 for re-transmission via output data frames 110A and 110B one frame later. The controllers 88 or 90 attach any command that they wish to be sent with each outgoing data frame. The database controller 88 may also issue modifying instructions to the cross-bar controller 90 providing for re-routing.

The cross-bar switch 96 comprises two dual port sets of static RAM, namely an address set 114 and a data set 116. The address set 114 contains address instructions on where to store each incoming byte of data so that it will be in the correct location for retrieval and re-transmission. Each dual port set of RAM 114 and 116 includes sixteen bytes for each communications link. In the present example, one optical link and four microwave links are provided, thereby resulting in eighty memory address locations per set. The data bus output of the address set 114 of the dual port RAM becomes the address bus input of the data set 116, as is shown at 118. The cross-bar controller 90 writes into the address dual port RAM 114 the location of the byte at which the current data is to be stored.

By way of example, and with reference to FIG. 4, a conversation exists between two subscribers or remote subscriber stations 119A and 119B which are linked to one another via microwave links 62A joining the local stations 54A. Subscriber station 119A has been allocated, by the cross-bar controller 90 at the central local station 54A, channel 2 of link L2 of the incoming data frame 98, as is shown by voice data "AA". Subscriber station 119B has similarly been allocated channel 0 of link L5 of an incoming data frame 119, as is shown by voice data "BB".

Channel 0 link L5 represents the fifth physical address of the dual port RAM 114. A bit counter 120, which is driven by the clock 108, on reading the number five, will simultaneously access the fifth physical address of the dual port RAM 114, in which a twelve is stored, and the fifth buffer 106C, in which the "BB" has been stored. Data "BB" is then transferred to address location twelve of the data set 116, as is indicated by the address number five of the address set 114.

Once the counter 120 has progressed to the twelfth address location, the data "BB" previously stored in the RAM data set 116 is then transferred to the output data latch 97E, and the data "AA", which has similarly been stored in the fifth location of the data set 116, is transferred to the output data latch 97F. The output circuitry is also provided with clock-driven three bit synchronisation components 124 both of which are derived synchronously from the common synchronisation generator 97C, as well as the command latch 94. Multiplexers 128 moves between the synchronisation components 124, the command latches 94 and the data latch 97E and 97F to build up the relevant data frames 110A and 110B via the parallel-to-serial shift registers 97A for transmitting on to the next pole exchange.

The Telephone

Referring now to FIG. 8, the telephone, or subscriber station 58 comprises a roof-mounted laser pair including a laser transmitter 132 and a laser receiver 134. A microprocessor-based controller 136 is at the heart of the telephone 58. Serial data from the receiver laser 134 is converted into parallel form by means of a serial-to-parallel converter 138. A clock regeneration, frame and bit synchronisation circuit 140 provides both bit and byte clocks for both the receive and the transmit circuits.

The serial-to-parallel converter 138 is driven by the bit clock from the bit synchronisation circuit 140 via a clock line 142. The bit counter of the bit synchronisation circuit 140 resets every frame, that is, every 136 bits, and checks the following three bits received to see if they are valid synchronising bits. If they are not, then the bit counter is adjusted by one count and the comparison is performed again when the bit counter resets. The bit counter is therefore adjusted until it is synchronised to receive frame synchronising bits. In a worst case scenario, it will take 135 frames to gain synchronicity. Once the bit synchronisation circuit 140 is synchronised to the receive frame, it transmits a valid synchronisation signal to the micro-controller 136 via a valid synchronisation line 144, in response to which the controller 136 starts its internal frame clock.

Once the bit synchronisation circuit 140 is synchronised, it also enables a command word latch 146, thereby to latch the receive command word in each frame. This command word is then read by the micro-controller 136. The micro-controller then only enables a voice channel latch 148 via a latch enable line 150 when the correct voice channel is received. Digital signals from the receiver voice channel latch 148 are converted by means of digital-to-analogue circuitry 152, and are then transmitted to a handset loudspeaker 154. The handset loudspeaker 154 is also activated by a tone generator 156, which is operated by the micro-controller 136.

If the micro-controller 136 needs to send a command word to the pole exchange 54, it puts a command byte onto the command bus 158, sets the input of a two-input multiplexer 160 to the command bus input, and latches the command byte into a transmit latch 162 via a latch enable line 164.

When the correct time slot for the command byte occurs in the receive frame, then the micro-controller 136 enables transmission of the transmit byte into a parallel-to-serial convertor 166, via a transmit enable line 168. The byte is then clocked out in serial form to the transmit laser 132 by means of a clock signal from a byte clock line 170.

The micro-controller 136 interprets and executes commands from the pole exchange 54. On request by the pole exchange 54 or during automatic logging in or powering up, it transmits a unique identification number 172 which is stored within the memory of the micro-controller 136. The unique identification number is unique to a particular telephone, and is entered during the manufacture of each telephone, and is entered during the manufacture of each telephone. This number remains unchanged, and is used for the purposes of record keeping at the system controller 64.

The micro-controller 136 also controls the operation of a keyboard circuit 174, which is used for dialling, and the tone generator 156, which provides the necessary ring, engaged and busy tones. An on-hook switch 176 is linked to the micro-controller, and is activated on release of the handset 178 from its wall-mounted bracket. The micro-controller also generates the required command words and dialling data which are input via the keyboard circuit 174. The micro-controller is instructed by the pole exchange 54, which transmits and receives voice channels to use in the respective receive and transmit frames. Voice output data travels from a handset microphone 180 to analogue-to-digital circuitry 182, which then drives a voice input line 184 of the multiplexer 160. The micro-controller 136 then sets the input line of the multiplexer 162 to the voice input line 134, and latches the voice data into the transmit latch 162.

When the correct time slot for the transmit voice channel occurs, the microcontroller 136 enables transmission of the parallel-to-serial convertor 166, and the voice byte is then sent in serial form from the transmit laser 132. When no data is being transmitted, the output to the transmit laser 132 is maintained in an off state by a signal from the transmit enable line 168.

On purchasing a telephone at a retail outlet, the subscriber then contacts the nearest payment office 69. At the payment office, all the subscriber's personal details are entered, and an account is opened bearing the unique identification number 172 of the telephone, and credited with the amount that the subscriber pays. Once the relevant information has been entered at the payment office, it is then transmitted via the microwave or cable link 69A to the system controller 64, where it is entered into the mass storage device 74. The subscriber then returns to his village with his newly purchased telephone, and installs it, which includes the step of mounting the laser transmitter 132 and the laser receiver 134 on his roof in line of sight with the nearest local station 54.

During the lining up procedure, the new subscriber station transmits a logging in message at periodic intervals to the local station, until the required optical link has been established. This is acknowledged by the local station transmitting an acknowledgement signal to the subscriber station, in response to which the subscriber station transmits its unique identification number. On receipt of this unique number, the database controller 88 at the pole exchange 83 extracts an unallocated three digit number from the RAM database 92, and combines it with the characteristic three digit local station number into a six digit telephone number, which is stored in the database 92 with the unique identification number of the new telephone. This six digit number is then transmitted down to the telephone via the voice synthesizer 92A.

The allocated telephone number and the unique identification number is simultaneously transmitted to the system controller via one or more of the local stations, and this data is matched with the same identification number which has been stored in the mass storage device 74, together with all the other subscriber and credit details which have been entered via the payment office 64. Provided that the consumer has a positive credit balance, an enable signal is then sent back to the new subscriber station, and the subscriber may then start to make telephone calls. All the necessary credit and subscriber data is downloaded from the system controller 64 to the database controller 88.

The system controller also transmits the updated information to all of the database controllers 88 at the other local stations 54A and 54B. The pole exchanges 83 at the local stations are then able to use the updated maps to determine the routing of a call via a number of different routes, so that in the event of one route being disabled or overloaded, an alternative route can be found.

If a subscriber moves his place of residence, he merely takes the telephone with him. Provided he moves within the same local exchange area, he will not have to contact the payment office. Naturally, if he is still within the same footprint 56, then he needs to take no further action. However, if he moves into a footprint covered by a different local station, he merely re-installs his telephone and communicates with the pole exchange, which will in turn notify the system controller of the new location of the telephone. The entire telephone network will then be updated in the manner described previously.

If a subscriber moves to a different exchange area, he will have to notify his local payment office, which will refund his outstanding credit. On reaching the new local exchange area, he then goes through the process of installing his telephone by initially visiting the nearest payment office, paying and providing his details in the manner described.

When a subscriber picks up his handset 178, a command word is transmitted via the transmit laser 132 to the pole exchange 54A in a manner previously described in the specification. The number of the caller is also received at the command processor 90, and this number is passed on to the database controller 88, which performs a validation test on the number. If a number does not pass the test, in that the phone is a stolen unit or has no available credit, then the call is terminated. On passing the test, the caller's phone is then allocated a channel to use and is allowed to proceed with the call. The database controller 88 may then activate the voice synthesizer, and sends the appropriate credit information down to the telephone 58 in its assigned channel.

The command processor 90 receives a number to be called, the structure of which determines whether it is a local call or a call to a remote area. If the call is local, command processor 90 will attempt to communicate with the relevant telephone via its command word. Should the telephone not respond, or report back that it is busy, then the caller is given an engaged signal and the call is terminated. If a telephone responds that it can accept a call, then it is also allocated a voice channel and the connection is set up via the cross-bar switch 96, as was explained earlier on in the specification. The database controller 88 is then informed that the connection has been set up, and the database controller 88 then begins to time the call against the credit of the caller.

If the credit drops to below zero, then the database controller 88 will inform the command processor 90 to interrupt the call and to terminate the connection. When one of the parties terminates a call, the command processor 90 terminates the connection and informs the database controller 88 that the call has ended. The remaining credit balance of the caller is then updated.

A call to a remote area is indicated by some form of code preceding the number to be called. In this case, the command processor 90 will send out the request on one of its external links 62 or 66, as is determined by the routing database 93. The targeted remote area exchange then interrogates the phone being called, assigns a channel to it, if it is available, and reports back this information to the call originating pole exchange 54. If the called phone is available, then the connection is made via the cross-bar switch on the relevant pole exchange, and is timed in the manner described. If the called phone is not available, then an engaged tone is sent to the calling phone and the call will be terminated.

Incoming traffic is analysed to check whether the local exchange area is a destination of any of the calls. If this is not the case, then the data is merely routed along the best path 62 or 66, to enable it to reach its destination with the aid of the routing database 93. If a local area is the destination for a call, the phone to be called is interrogated in the manner described, a channel is assigned to it and the connection is set up in the cross-bar switch 96. Calls between local and remote areas only require one voice channel, as up to sixteen calls can be accommodated at any one time if they are all of this type.

In the event of a number of subscribers all starting conversations in the same frame at the same time, there will be a clash of messages, resulting in the pole exchange not being able to receive an uncorrupted signal, and not knowing who has been calling it. In order to cater for this situation, each of the subscriber stations attempts to make a call and then waits off for a variable number of frames before trying again. By random staggering of the frames, clashing of messages is minimised. Should all sixteen communication channels be occupied, a busy signal is sent back to the user and the user has to wait until a free channel becomes available.

The particular configuration of the telecommunications network, especially as described in the second preferred embodiment, provides it with certain advantageous features. The network is essentially self-maintaining, in that it automatically caters for the adding of new telephones, the replacing of telephones and the moving of existing telephones to be covered by different local stations. Furthermore, if a new pole exchange is added, then the system controller will automatically update its map of the entire network and download this information to all of the pole exchanges. Self reporting of network faults is another advantageous feature.

If the subscriber reports the theft of his phone to the relevant authorities, the particular unique identification number is blacklisted throughout the network, which will assure that the stolen phone is totally inoperable.

A major advantage of the telecommunications network of the invention is that it avoids the need for an expensive copper-wired network with the network infrastructure and maintenance problems associated therewith. The optical links between the subscriber stations and the pole exchanges do not employ critical components, as would be the case in respect of radio links.

As the telephone is installed by the subscriber, there is no requirement for a large staff of service personnel. By means of the voice synthesizer located in the pole exchange 54, the telephone network can be customised to suit the language requirements of a local population. By employing a credit-based system incorporating a pay office, payment for all calls is guaranteed. Maintenance staff are minimised, as the subscriber may personally return his telephone to the supplier should a fault arise. The re-routing facility allows faulty or overworked pole exchanges to be bypassed.

The optical link established between each local station and the individual subscriber stations may be replaced with a microwave link or a radio link, although these would probably be less cost-effective. The telecommunications network of the invention is also not confined to a village-based application. It can be extended to a corporate environment in which radiating sources can be located in each room and a person is able to move around the building carrying a subscriber station which has a particular telephone number and an ID number associated therewith. The various telephone messages are radiated in a multiplex fashion from every room into the volume of that room. The telecommunications system can therefore support up to sixteen corporate conversations through the PABX irrespective of the locations of the various users. It is envisaged that this will be a less expensive system than an existing radio telephone system, which relies on the use of relatively expensive tuned circuits and technology which raises the costs of the individual subscriber stations.

We claim:

1. A telecommunications network comprising:
   a distributed network of decentralized local stations interconnected by a plurality of telecommunications links, each local station being arranged to service a settlement of dwellings, and a plurality of static subscriber stations configured in a cluster around a local station, each static subscriber station having a unique identification code and being associated with a dwelling in the settlement, wherein each local station includes:
   a) an elevated optical transmitter arranged to transmit a common optical telecommunications footprint over the plurality of static subscriber stations;
   b) an elevated optical receiver arranged to receive from each of the subscriber stations directional optical telecommunications signals;
   c) local station transceiver means for serially transmitting and receiving voice and data signals to and from other local stations in the network via the telecommunications links;
   d) a local exchange including first switching means for connecting calls between one static subscriber station and another within a particular local station, second switching means for connecting calls between a static subscriber station a remote local station remote from the subscriber station, and third switching means for connecting calls from one neighboring local station to another via the local station;
   e) a routing database linked to the local exchange for assisting in routing calls to distal local stations along at least one path;
   f) a subscriber database incorporating details of static subscriber stations linked directly to a particular local station and including the unique identification codes of and telephone numbers assigned to each static subscriber station, and
   g) at least one database controller for controlling the operation of the subscriber and routing databases.

2. The telecommunications network according to claim 1 which further comprises a system controller for managing databases of the local stations, the system controller including a system controller database incorporating a network map, subscriber data and local station data, the system controller being arranged to download data to the local stations via the telecommunications links.

3. The telecommunications network according to claim 1 in which the first, second and third switching means each comprise a cross bar switch arrangement and a cross bar controller for controlling the switch arrangement.

4. The telecommunications network according to claim 3 in which the cross bar switch arrangement includes interchangeable address and data set memory locations.

5. The telecommunications network according to claim 1 in which each local station includes synchronization circuitry for transmitting a synchronizing signal from the local station simultaneously to the plurality of static subscriber stations in the vicinity of the local station for synchronizing a command data frame at the local station with a reply data frame originating from at least one of the static subscriber stations.

6. The telecommunications network according to claim 1 which includes updating means for continuously and automatically updating the subscriber and the routing databases via the local or static subscriber stations in response to a change in the configuration of the network, the updating means including allocating means for automatically allocating a telephone number to a static subscriber station on joining the network.

7. The telecommunications network according to claim 6 in which the allocating means includes a database controller at each local station for receiving the unique code from each static subscriber station, for generating the telephone number by combining an allocated number from the database with a local station identification code, and a voice synthesizer for transmitting the allocated telephone number to the static subscriber station.

8. The telecommunication network according to claim 1 in which each static subscriber station includes a directional laser transmitter and a laser receiver arranged to be mounted and aimed in line-of-sight with the local station for allowing it to be incorporated with the network, and clock regeneration, frame and bit synchronization circuitry for controlling the timing and synchronicity of data frames received and transmitted via the respective laser receiver and transmitter, and being arranged to select and to receive a frame synchronizing bit.

9. The telecommunications network according to claim 2 in which at least one of the local stations and the system controller includes interface means for interfacing the network to a public switch telephone network.

10. The telecommunications network according to claim 1 wherein said telecommunication link is a microwave link.

* * * * *

UNITED STATES PATENT AND TRADEMARK OFFICE
CERTIFICATE OF CORRECTION

PATENT NO. : 5,463,671
DATED : October 31, 1995
INVENTOR(S) : Michael J.C. MARSH et al.

It is certified that error appears in the above-indentified patent and that said Letters Patent is hereby corrected as shown below:

Column 14, line 44, after "station" insert --and--;

Signed and Sealed this

Seventeenth Day of September, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO.  : 5,463,671
DATED       : October 31, 1995
INVENTOR(S) : Michael J.C. MARSH et al.

It is certified that error appears in the above-indentified patent and that said Letters Patent is hereby corrected as shown below:

Column 14, line 67, delete "each".

Signed and Sealed this

Tenth Day of June, 1997

Attest:

BRUCE LEHMAN

Attesting Officer

Commissioner of Patents and Trademarks